United States Patent
Pickering et al.

(10) Patent No.: US 6,586,100 B1
(45) Date of Patent: *Jul. 1, 2003

(54) FLUOROCARBON-SILICONE INTERPENETRATING NETWORK USEFUL AS FUSER MEMBER COATING

(75) Inventors: Jerry A. Pickering, Hilton, NY (US); Stephen V. Davis, Rochester, NY (US); Jiann H. Chen, Fairport, NY (US)

(73) Assignee: NexPress Solutions LLC, Rochester, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 492 days.

(21) Appl. No.: 09/213,070

(22) Filed: Dec. 16, 1998

(51) Int. Cl.$^7$ .................. B32B 25/14; B32B 25/20; C08L 83/04; C08L 83/08; C08L 3/14
(52) U.S. Cl. ................. 428/421; 428/422; 428/447; 525/100; 525/101; 525/102; 525/104; 399/333
(58) Field of Search ................. 428/421, 422, 428/447; 525/100, 101, 102, 104; 399/333

(56) References Cited

U.S. PATENT DOCUMENTS

| | | | |
|---|---|---|---|
| 4,264,181 A | 4/1981 | Lentz et al. | 355/3 FU |
| 4,272,179 A | 6/1981 | Seanor | 355/3 FU |
| 4,853,737 A | 8/1989 | Hartley et al. | 355/289 |
| 5,141,788 A | 8/1992 | Badesha et al. | 428/36.8 |
| 5,166,031 A | 11/1992 | Badesha et al. | 430/124 |
| 5,534,347 A | 7/1996 | Chen et al. | 428/421 |
| 5,582,917 A | 12/1996 | Chen et al. | 428/421 |
| 5,695,878 A | 12/1997 | Badesha et al. | 428/334 |

*Primary Examiner*—Vivian Chen

(57) ABSTRACT

A fuser member whose outermost layer comprises a fluorocarbon-silicone interpenetrating network, comprising: (a) a first polymer comprising a fluorocarbon elastomer; (b) a second polymer selected from a curable polyfunctional poly($C_{(1-6)}$ alkyl)siloxane polymer; a curable polyfunctional poly($C_{(1-6)}$ alkyl)arylsiloxane polymer; and combinations thereof; and (c) a functionalized polydimethylsiloxane containing amine groups.

28 Claims, No Drawings

FLUOROCARBON-SILICONE INTERPENETRATING NETWORK USEFUL AS FUSER MEMBER COATING

FIELD OF THE INVENTION

The present invention relates to polymeric compositions suitable for coating articles such as toner fusing members. More particularly, the invention relates to a fluorocarbon-silicone polymeric composition.

BACKGROUND OF THE INVENTION

In certain electrostatographic imaging and recording processes, for instance, in electrophotographic copying processes, an electrostatic latent image formed on a photoconductive surface is developed with a developer which is a mixture of carrier particles, e.g., magnetic particles, and a thermoplastic toner powder which is thereafter fused to a receiver such as a sheet of paper. The fusing member can be a roll, belt or any surface having a suitable shape for fixing thermoplastic toner powder images to a substrate. The fusing step commonly consists of passing the substrate, such as a sheet of paper on which toner powder is distributed in an image-wise pattern, through the nip of a pair of rolls, at least one of which is heated. Where the fusing member is a belt it is preferably a flexible endless belt which passes around a heated roller.

A persistent problem in this operation is that when the toner is heated during contact with the heated roll or belt it may adhere not only to the paper but also to the fusing member. Any toner remaining adhered to the member can cause a false offset image to appear on the next sheet and can also degrade the fusing member. Other potential problems are thermal degradation and abrasion of the member surface which results in an uneven surface and defective patterns in thermally fixed images.

Toner fusing rolls have a cylindrical core which may contain a heat source in its interior, and a resilient covering layer formed directly or indirectly on the surface of the core. Roll coverings are commonly fluorocarbon polymers or silicone polymers, such as poly(dimethylsiloxane) polymers, of low surface energy which minimizes adherence of toner to the roll. Frequently release oils composed of, for example, poly(dimethylsiloxanes), are also applied to the roll surface to prevent adherence of toner to the roll. Such release oils may interact with the roll surface upon repeated use and in time cause swelling, softening and degradation of the roll. Silicone rubber covering layers which are insufficiently resistant to release oils and cleaning solvents are also susceptible to delamination of the roll cover after repeated heating and cooling cycles.

Toner fusing belts are composed of a continuous flexible material having a smooth surface and superior resistance to heat. The belt substrate can be metallic or polymeric. The surface of the belt is composed of a thinly coated, low surface-energy polymer such as a fluorocarbon or a silicone-polymer.

Fusing members with a surface coating of a fluoroelastomer, especially vinylidene fluoride based fluoroelastomers, possess excellent heat, oil and chemical resistance as well as good fatigue and wear characteristics. However, fluoroelastomers with these excellent chemical and mechanical properties have a propensity to interact with toners, especially in comparison with polydimethylsiloxane surfaces, causing premature offset.

U.S. Pat. No. 4,264,181 discloses fusing members coated with a metal-filled elastomer surface obtained by nucleophilic-addition curing of a mixture of a metal filler and a vinylidene fluoride-hexafluoropropylene copolymer. Mixtures of the fluoroelastomers with silicone rubbers were mentioned (column 8, lines 26–29) but no specific examples of suitable silicones are taught. The surface coatings disclosed are used in conjunction with functionally substituted polymeric release agents capable of interacting with the metal component.

U.S. Pat. No. 4,853,737 (incorporated herein by reference) discloses a roll useful in electrostatography having an outer layer comprising cured fluoroelastomers containing pendant polydiorgano-siloxane segments that are covalently bound to the backbone of the fluoroelastomer. Unlike the current invention, the silicon content described in this patent must be kept very low in practice to avoid incompatibility.

U.S. Pat. No. 5,141,788; U.S. Pat. No. 5,166,031; and U.S. Pat. No. 5,695,878 disclose a fuser member comprising a supporting substrate having an outer layer of a volume grafted elastomer which is a substantially uniform integral interpenetrating network (hereinafter IPN) of a hybrid composition of a fluoroelastomer and a polyorganosiloxane, where said volume graft has been formed by dehydrofluorination of said fluoroelastomer by a nucleophilic dehydrofluorinating agent, followed by addition polymerization by the addition of an alkene or alkyne functionally terminated polyorganosiloxane and a polymerization initiator. The disadvantage of this is that it usually involves at least two extra reaction steps to produce higher silicone contents without phase separation. Also the resulting network structure forms a higher silicone concentration on the surface through stratification and as such has poorer wear resistance.

U.S. Pat. No. 5,534,347 discloses toner fusing rolls having an oil barrier layer composed of a substrate coated with a fluorocarbon-silicone polymeric composition which is obtained by concurrently curing a fluorocarbon copolymer, a nucleophilic fluorocarbon-curing agent and a heat curable polyfuctional poly ($C_{1-6}$ alkyl)arylsiloxane polymer. This patent does not describe a release layer as the surface energy of the resulting material was too high.

Similarly, U.S. Pat. No. 5,582,917 discloses toner fusing members having a surface layer comprising a substrate coated with a fluorocarbon-silicone polymeric composition obtained by concurrently curing a fluorocarbon copolymer, a nucleophilic fluorocarbon curing agent and a heat curable polyfunctional polymethylsiloxane polymer. The disadvantage of these last two patents is in the production methods needed to manufacture these materials. In these patents, mechanical mixing is described as being necessary to eliminate phase separation of the silicone from the fluorocarbon phases. In general the two phases are forced into intimate contact with the possibility of some measure of reaction within both of the phases. This reaction effectively eliminated the tendency for bulk phase separation. However the processability, if practiced as described, would decrease the shelf life of the dry material.

U.S. patent application Ser. No. 09/156,831 describes solution blending silicones with fluorocarbon elastomers to obtain good release coatings. These coatings have the advantage of fluorocarbon strength and the good release of silicones. Unfortunately only moderate amounts of silicone can be combined with the fluorocarbon elastomer before large scale phase incompatability occurs. Such incompatability negatively impacts image and release qualities.

The materials in the '347 and '917 patents above are suitable for most applications; however, as the trend in electrophotographic processes is to increase the process speed and achieve longer component life, those materials are no longer acceptable. Thus, there is still a need for manufacturable coating compositions based on fluorocarbon copolymers which resist abrasion, interact minimally with toners and resist offset while retaining the advantageous mechanical and chemical properties characteristic of fluoroelastomers. This requires materials having higher silicone content for better intrinsic release properties, and fewer surface defects for toner attachment. In addition, there is a need to control the coating surface properties without recourse to additional processing steps such as grinding or polishing.

SUMMARY OF THE INVENTION

The present invention relates to a fuser member polymeric composition containing a fluorocarbon-silicone interpenetrating network, comprising:

a) a first polymer comprising a fluorocarbon elastomer;

b) a second polymer selected from a curable polyfunctional poly($C_{(1-6)}$ alkyl)siloxane polymer; a curable polyfunctional poly($C_{(1-6)}$ alkyl)arylsiloxane polymer; and combinations thereof;

c) a functionalized polydimethylsiloxane; and d) means for curing the fluorocarbon elastomer.

As used herein the term "curable polyfunctional siloxane polymer" refers to a curable polyfunctional poly($C_{(1-6)}$ alkyl)siloxane polymer; a curable polyfunctional poly($C_{(1-6)}$ alkyl)arylsiloxane polymer; and combinations thereof.

As used hereafter "Interpenetrating Polymer Network" (IPN) refers to two or more cocontinuous polymer networks neither of which necessarily chemically bonds with each other. The two networks comingle at a molecular level.

In another aspect of the invention a fluorocarbon-curing agent and a fluorocarbon-curing accelerator are included in the composition.

An advantage of the present invention is that it allows for the incorporation of higher amounts of silicone to give improved release without affecting phase size or coating quality and roughness.

Another advantage of the present invention is that it extends the range of useful fluoroelastomers to include those of higher fluorine content allowing for better release and wear resistance without adversely affecting coating quality or roughness.

Another advantage of the present invention is that it improves coating quality.

DETAILED DESCRIPTION OF THE INVENTION

The coating composition is obtained by compounding the fluorocarbon copolymer, metal oxide or hydroxides to act as acid acceptors, fluorocarbon-curing agent with a fluorocarbon-curing accelerator and optional other fillers to form a material suitable for dispersion in a solvent. The accelerator and fillers are optional; the curing agent may be omitted at this stage and added just before the composition is applied as a coating to a surface. The accelerator promotes crosslinking between the curing agent and the fluorocarbon copolymer.

As used herein, the term "copolymer refers to the product of polymerization of two or more substances at the same time, for example terpolymers which contain three distinct monomers.

Prior to coating this material, a curable polyfunctional poly($C_{(1-6)}$ alkyl)siloxane polymer and/or a curable polyfunctional poly($C_{(1-6)}$ alkyl)arylsiloxane polymer is added. The siloxane polymer is preferably heat-curable and can comprise one or more polyfunctional poly($C_{(1-6)}$ alkyl) siloxane polymers, copolymers, polyfunctional poly($C_{(1-6)}$ alkyl)arylsiloxane polymer or reaction products of such materials. The siloxane polymer is cured concurrently with the fluorocarbon copolymer. The resulting mixture is solution milled to form a homogeneous mixture.

Also prior to coating or concurrent with the previous step a functionalized polydimethylsiloxane is added. The functionalized polydimethylsiloxane has the general structure described in patent U.S. Pat. No. 4,853,737 (incorporated herein by reference):

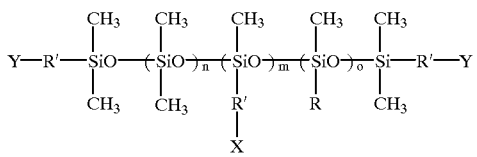

where

R and R' are independantly alkyl; haloalkyl; aryl; alkylene; or arylene; all having 1 to 10 carbon atoms;

X and Y are functional groups having an active hydrogen such as —OH, —NH$_2$, —NR"H, —SH, —NHCO$_2$, where R" is $C_{(1-6)}$ alkyl or aryl such as phenyl. Alternatively R'—Y and R'—X can be —H or —OH.

n, m and o are positive integers including zero such that n+m+o provides a number average molecular weight (Mn) in the range of about 1000 to 20,000, often 2,000 to 15,000. In another embodiment groups Y may be hydrogen and m is greater than zero. Each polydimethylsiloxane chain should have at least one functional group capable of forming a chemical bond to the fluorocarbon elastomer and no functional groups capable of co-condensing with the curable polyfunctional poly($C_{(1-6)}$ alkyl)siloxane polymer and/or a curable polyfunctional poly($C_{(1-6)}$ alkyl)arylsiloxane polymer.

In another embodiment of this invention, the functionalized polydimethylsiloxane is prereacted with the fluoropolymer prior to adding the curable polyfunctional poly($C_{(1-6)}$ alkyl)siloxane polymer and/or a curable polyfunctional poly ($C_{(1-6)}$ alkyl)arylsiloxane polymer prior to coating.

While not wishing to be bound by any particular theory, it is believed that the concurrent curing of the individual polymers of the mixture results in an interpenetrating network of the separately crosslinked polymers. That is, the network formed by crosslinking the fluorocarbon copolymer with the fluorocarbon-curing agent and the network formed by crosslinking of the curable polyfunctional siloxane polymer mesh together to create an interpenetrating polymeric network. The addition of the functionalized polydimethylsiloxane further benefits the material by (1) increasing the silicone (low surface energy) content of the material and by (2) decreasing the phase size of the silicone in the material. This allows better wetting of the fuser member by the release fluids. Also (3) the presence of the functionalized polydimethylsiloxane reactable with the fluorocarbon elastomer allows incorporation of increased amounts of curable polyfunctional siloxane polymer at the same time that the presence of the curable polyfunctional siloxane polymer allows incorporation of the functionalized polydimethylsiloxane at levels that would otherwise result in catastrophic phase separation. The cured polymeric mixture forms a coating with advantageous release properties attributable to the silicones and mechanical and chemical properties characteristic of the fluorocarbon copolymer are retained.

Fluorocarbon copolymers and silicones tend to phase separate because, on a molecular level, they are incompatible and will not readily mix. Phase separation can be avoided by the methods of the instant invention. Specifically:

compounding the fluorocarbon copolymers and the optional addenda, such as the curing agent, accelerators and fillers to form an intimate, homogeneous, solid mixture; and dispersing the solid mixture along with the curable polyfunctional poly($C_{(1-6)}$ alkyl)siloxane polymer and/or curable polyfunctional poly($C_{(1-6)}$ alkyl)arylsiloxane polymer with a molecular weight sufficient to allow dispersion. Also, the solvent system must not hinder reaction of the silicon phase as such hindered reaction would cause subsequent phase separation. By "suitable solvent" is meant a solvent that can dissolve both phases and will not restrict the silicone cure. One such appropriate solution is 2-butanone preferably containing less then 5% by weight of methanol. Minimal methanol is needed, as distinct from 3M Processing Digest, Vol 17 (3), October, 1986, which describes the use of methanol to increase solution pot life. As the reaction rate slows in solution the tendency for phase separation increases. Other suitable solvents include methyl ethyl ketone, methyl isobutyl ketone, ethyl ketone and mixtures of the foregoing containing less than 15% of cosolvents methanol, ethanol and acetone as well as similar solvents/solvent systems as would be known to those skilled in the art.

The addition of the functionalized polydimethylsiloxane allows incorporation of increased amount of the curable polyfunctional siloxane polymer at the same time that the presence of the curable polyfunctional siloxane polymer allows incorporation of the functionalized polydimethylsiloxed at levels that would otherwise result in catastrophic phase separation. This addition results in the ability to form the material from an increased list of fluorocarbon elastomers whereas otherwise an increasing fluorine content and decreasing reactivity limit the amount of curable polyfunctional poly($C_{(1-6)}$ alkyl)siloxane polymer and/or curable polyfunctional poly($C_{(1-6)}$ alkyl)arylsiloxane polymer which can be added. The increased flexibility in the amount of curable polyfunctional poly($C_{(1-6)}$ alkyl)siloxane polymer and/or curable polyfunctional poly($C_{(1-6)}$ alkyl)arylsiloxane polymer which can be incorporated as well as the similarly evolved ability to incorporate functionalized polydimethylsiloxane is evidenced through reduced phase size and phase separation.

In a preferred embodiment of the invention the fluorocarbon-silicone interpenetrating network comprises a solid fluorocarbon copolymer and a liquid, curable polyfunctional poly($C_{(1-6)}$ alkyl)siloxane polymer, for example, a polyfunctional hydroxy-functionalized poly($C_{(1-6)}$ alkyl) siloxane polymer.

The curable polyfunctional siloxane polymer preferably has a number average molecular weight range of greater than 20,000 when measured, for example, by size-exclusion chromatography (SEC). The polyfunctional poly($C_{(1-6)}$ alkyl)arylsiloxane polymer preferably has a number average molecular weight range of greater than 2000 when measured, for example, by size exclusion chromatography.

The functionalized polydimethylsiloxane polymer preferably has a number average molecular weight range of between 1000 and 50,000 when measured, for example, by size-exclusion chromatography (SEC). The functionalized polydimethylsiloxane more preferably has a number average molecular weight range between 2000 and 15,000 when measured, for example, by size exclusion chromatography.

Such components do not readily form homogeneous mixtures due to phase separation. However, the present invention teaches that by solution dispersion in a media conducive to further polymerization of the polyfunctional hydroxy-functionalized poly($C_{(1-6)}$ alkyl)siloxane polymer with the mechanically compounded fluorocarbon copolymer and the optional addenda in the designated sequence and under the conditions taught, suitable compositions can be obtained.

Compounding (mechanical mixing) is preferably carried out in a two-roll mill by compounding the fluorocarbon copolymer, the accelerator and fillers (if present) until a uniform, dry, smooth sheet is obtained. This compounding process can be carried out at a temperature of, for example, from 50° to 70° F. (approx. 10° to 21° C.), preferably from 55° to 65° F. (approx. 13° to 28° C.). Compounding of the mixture prior to addition of the siloxane oil affords an even band in 30 to 60 minutes. The fluorocarbon-curing agent can then be added and compounded in until a uniform, dry, flexible composite sheet is obtained. Variations to the order of addition of the components can be made by those skilled in the art without causing disintegration of the composition. Subsequently, the liquid, curable siloxane polymer is added along with the compounded material (now in sheet form), into a suitable solvent so that the siloxane oil is uniformly distributed and in intimate contact with the fluorocarbon copolymer.

The composition obtained by such a process can be reduced to small particles for dispersing in a coating solvent without phase separation occurring. The particles are small enough to effect solution of the soluble components in less than about 5 hours, thus minimizing gel formation for compositions having a tendency to gel rapidly. Before the composition is applied as a coating, it can be degassed to remove all dissolved gasses.

In yet another aspect of the invention, for example when a solvent transfer coating process is contemplated, the fluorocarbon-curing agent can be withheld from the compounding mixture and added to the coating medium, thus minimizing any tendency for premature curing of the composition.

Suitable fluorocarbon copolymers of the invention include the vinylidene fluoride based fluoroelastomers containing hexafluoropropylene known commercially as Viton® A. Also suitable are the terpolymers of vinylidene fluoride, hexafluoropropylene and tetrafluoroethylene known commercially as Viton® B, Fluorel™ 5840Q, Fluorel™ 2630 and Fluorel™ FX-9038. Viton® A, Viton® GF and Viton® B and other Viton® designations are trademarks of E.I. Dupont de Nemours and Company, commercially available materials include, for example, vinylidene fluoride-hexafluoropropylene copolymers Fluorel™ FX-2530, Fluorel™ FC 2174 and Fluorel™ FC 2176. Fluorel™ is a trademark of 3M Company. Other vinylidene fluoride based polymers which can be used are disclosed in U.S. Pat. No. 4,272,179 the disclosure of which is hereby incorporated by reference. Mixtures of the foregoing vinylidene fluoride-based fluoroelastomers may also be suitable. Although it is not critical in the practice of this invention, the number-average molecular weight range of the fluorocarbon copolymers may vary from a low of about 10,000 to a high of about 200,000. In the more preferred embodiments, the vinylidene fluoride-based fluoroelastomers have a number-average molecular weight range of about 50,000 to about 100,000.

Suitable means for curing the fluorocarbon are fluorocarbon-curing agents or crosslinking agents including the nucleophilic addition curing agents as disclosed, for example, in the patent to Seanor, U.S. Pat. No. 4,272,179, incorporated herein by reference. The nucleophilic addition cure system is well known in the prior art. Exemplary of this cure system is one comprising a bisphenol crosslinking agent and an organophosphonium salt as accelerator. Suitable bisphenols include 2,2-bis(4-hydroxyphenyl) hexafluoropropane, 4,4-isopropylidenediphenol and the like. Although other conventional cure or crosslinking systems may be used to cure the fluoroelastomers useful in the present invention, for example, free radical initiators, such as an organic peroxide, for example, dicumyl peroxide and dichlorobenzoyl peroxide, or 2,5-dimethyl-2,5-di-t-butylperoxyhexane with triallyl cyanurate, the nucleophilic addition system is preferred.

Suitable accelerators for the bisphenol curing method include organophosphonium salts, e.g., halides such as benzyl triphenylphosphonium chloride, as disclosed in U.S. Pat. No. 4,272,179 cited above.

Suitable fillers for producing these composites include mineral oxides, such as alumina, silicate or titanate, and carbon of various grades. Nucleophilic addition-cure systems used in conjunction with fluorocarbon copolymers can generate hydrogen fluoride and thus acid acceptors are added as fillers. Suitable acid acceptors include metal oxides or hydroxides such as magnesium oxide, calcium hydroxide, lead oxide, copper oxide and the like, which can be used as mixtures with the aforementioned fillers in various proportions.

The preferred curable polyfunctional poly($C_{(1-6)}$ alkyl) siloxane and/or a curable polyfunctional poly($C_{(1-6)}$ alkyl) arylsiloxane polymers, useful in the practice of this invention, when cured concurrently with the fluoroelastomers, produce a coating suitable for use as the surface coating of a fusing member. Such coated fusing members have low energy surfaces which release toner images with minimal offset. These coatings can also be advantageously used with small amounts of externally added polymeric release agents, for example mercapto-, amino-, or silane-functionalized polydimethylsiloxanes, to further minimize offset. In general toners are primarily composed of materials including polyether, poylester, polystyrene-acrylate and other such materials as is known by one skilled in the art.

Preferred curable polyfunctional poly($C_{(1-6)}$ alkyl) siloxane polymers and/or a curable polyfunctional poly($C_{(1-6)}$ alkyl)arylsiloxane polymer are heat-curable silicones; however peroxide-curable silicones can also be used with conventional initiators. Heat-curable silicones include the hydroxy-functionalized polyfunctional organopolysiloxanes belonging to the class of silicones known as "soft" silicones. Preferred soft silicones are silanol-terminated polyfunctional organopolysiloxanes containing repeating units of the formula,

$(R^1)_a \, SiO_{(4-a)/2}$ wherein $R^1$ is $C_{(1-6)}$ alkyl and a is 0 to 3.

Alkyl groups which $R^1$ can represent include methyl, ethyl, propyl, isopropyl, butyl, sec.butyl, pentyl and hexyl. Preferred soft silicones are those in which $R^1$ is methyl.

Preferred curable poly($C_{(1-6)}$ alkyl)arylsiloxane polymers are heat-curable siloxanes, however peroxide-curable siloxanes can also be used with conventional initiators. Heat curable siloxane polymers include he hydroxy-functionalized organopolysiloxanes belonging to the classes of silicones known as "hard" and "soft" silicones. Preferred hard and soft silicones are silanol-terminated polyfunctional organopolysiloxanes containing repeating units of the formula,

$R^1_a R^2_b SiO_{(4-(a+b))}$ wherein:

$R^1$ and $R^2$ are independently ($C_{(1-6)}$ alkyl) or aryl; and a and b are independently 0 to 3.

Alkyl groups which $R^1$ and $R^2$ can represent include methyl, ethyl, propyl, isopropyl, butyl, sec.butyl, pentyl and hexyl. Preferred hard and soft silicones are those in which $R^1$ and $R^2$ are independently methyl or phenyl.

Both hard and soft silicones can contain various proportions of mono-, di-, tri- and tetra-functional siloxane repeating units. The degree of functionality influences the hardness of the silicone. In general, the greater the functionality the harder is the silicone. However, the predominant influence on hardness is the ratio of aryl to alkyl groups present. Preferred hard silicones are characterized by having a ratio of phenyl to methyl groups greater than 0.5 and are non-flowable, preferably between about 1:1 and 2 to 1. Soft silicones have a ratio of aryl to methyl groups less than 0.5, preferably no aryl groups are present and are flowable. Hard silicones generally have a number-average molecular weight of less than about 10,000, preferably less than about 4,000. Polyfunctional hard silicones of such molecular weights have a high level of crosslinking on curing which contributes to the hardness. Soft silicones generally have a number-average molecular weight of greater than 20,000, preferably greater than 100,000 which results in a low level of crosslinking on curing hard and soft silicones can be used singly or as mixtures of silicones and, in addition, can contain minor amounts of one or more polyfunctional silicones having number-average molecular weights in the range of 1,000 to 300,000.

Particularly suitable silicones are the heat-curable silanol-terminated hard silicone copolymers comprising difunctional and trifunctional siloxane repeating units of the formulae, $R^3_2SiO$ and $R^4SiO_{1.5}$ wherein $R^3$ and $R^4$ are independently methyl or phenyl provided that the ratio of phenyl to methyl groups is at least about 1 to 1.

Exemplary hard and soft silicones are commercially available or can be prepared by conventional methods. For example, DC6-2230 silicone and DC-806A silicone (sold by Dow Corning Corp.), are hard silicone polymers, and SFR-100 silicone (sold by General Electric Co.) and EC 4952 silicone (sold by Emerson Cummings Co.), are soft silicone polymers. DC6-2230 silicone is characterized as a silanol-terminated polymethyl phenylsiloxane copolymer containing phenyl to methyl groups in a ratio of about 1 to 1, difunctional to trifunctional siloxane units in a ratio of about 0.1 to 1 and having a number-average molecular weight between 2,000 and 4,000. DC 806A silicone is characterized as a silanol-terminated polymethyl phenylsiloxane copolymer containing phenyl to methyl groups in a ratio of about 1 to 1 and having difunctional to trifunctional siloxane units in a ratio of about 0.5 to 1. SFR 100 silicone is characterized as a silanol- or trimethylsilyl-terminated polymethylsiloxane and is a liquid blend comprising about 60–80 weight percent of a difunctional polydimethylsiloxane having a number-average molecular weight of about 150,000 and 20–40 weight percent of a polymethylsilyl silicate resin having monofunctional (i.e. trimethylsiloxane) and tetrafunctional (i.e. $SiO_2$) repeating units in an average ratio of between about 0.8 and 1 to 1, and having a number-average molecular weight of about 2,500. EC 4952 silicone is characterized as a silanol-terminated polymethylsiloxane having about 85 mole percent of difunctional dimethylsiloxane repeating units, about 15 mole percent of trifunctional methylsiloxane repeating units and having a number-average molecular weight of about 21,000. Other polyfunctional poly($C_{(1-6)}$ alkyl)siloxane polymers which can be used are disclosed in U.S. Pat. Nos. 4,387,176 and 4,536,529, the disclosures of which are hereby incorporated by reference.

Preferred compositions of the invention have a ratio of siloxane polymer to fluorocarbon copolymer between about 0.1 and 3 to 1 by weight, preferably between about 0.2 and 1 to 1. The composite is preferably obtained by curing a mixture comprising 100 parts of a fluorocarbon copolymer, 10–120 parts of a curable polyfunctional polymethylsiloxane polymer, most preferably about 20–80 parts, 1–50 parts of a functional polydimethylsiloxane, most preferably having a ratio of functional silicone to curable silicone of between 0.025 and 0.4 to 1, 1–10 parts of a fluorocarbon-curing agent, 1–10 parts of a fluorocarbon-curing accelerator, 5–30 parts of an acid acceptor type filler, and 0–30 volume percent of an inert filler.

Curing of the composite is carried out according to the well known conditions for curing vinylidene fluoride based copolymers ranging, for example, from about 12–48 hours at temperatures of between 50° C. to 250° C. Preferably the coated composition is dried until solvent free at room temperature, then gradually heated to about 230° C. over 24 hours, then maintained at that temperature for 24 hours.

In accordance with the present invention, the coated article can be a fusing member in the form of a roll, belt or any surface having a suitable configuration for fixing or fusing a thermoplastic toner image to a receiver such as a paper sheet. The underlying structure onto which the coating is applied is called the substrate. When used with fusing rolls, substrate onto which the composite of the invention can be coated directly on is the fusing roll core preferably the coating is applied on an underlying intermediate layer which is bonded directly or indirectly to the core. This intermediate layer is preferably a silicone elastomer, for example, EC 4952 silicone (sold by Emerson Cummings Co.). When the fusing member is in the form of a belt, the belt comprises a continuous flexible substrate made of metal or polymeric material onto which the composite of the invention can be coated. The fusing members can be coated by conventional techniques, however, solvent transfer coating techniques are preferred.

Coating solvents which can be used include polar solvents, for example, ketones, acetates and the like. Preferred solvents for the fluoroelastomer based composites are the ketones, especially methyl ethyl ketone and methyl isobutyl ketone. The composites of the invention are dispersed in the coating solvent at a concentration of between about 10 to 50 weight percent, preferably between about 20 to 30 weight percent and coated on the fusing member to give a 10 to 100 µm thick sheet on drying. The coated article is cured under the conditions described above.

The cured coatings of the invention have low surface energies and exhibit good adhesion to underlying layers and substrates. Such coatings have excellent resistance to abrasion as measured on a Norman Abrader apparatus and retain the advantageous mechanical and chemical properties characteristic of fluoroelastomers, such as hardness, elongation, tensile and tear strength and resistance to releasing oils. In addition, when evaluated as image-fixing media, the coatings have shown minimal reactivity with thermoplastic toner powders while showing desirable release properties with minimal or no offsetting under simulated fusing conditions.

The rolls and belts produced in accordance with the present invention are thus useful in electro-photographic copying machines to fuse heat-softenable toner to an image carrying receiver sheet. This can be accomplished by contacting a receiver, such as a sheet of paper, to which toner particles are electrostatically attracted in an imagewise fashion with such a fusing member. Such contact is maintained at a temperature and pressure sufficient to fuse the toner to the receiver.

The following examples illustrate the compounding, coating, curing and testing of fluorocarbon-silicone polymeric compositions.

The SFR-100 silicone used on the examples described below was obtained from General Electric Co. and was determined by size exclusion chromatography and NMR to consist essentially of a mixture of about 70 weight percent of a polydimethylsiloxane having a number-average molecular weight of about 150,000, and about 30 weight percent of a polytrimethylsilyl silicate resin having monofunctional and tetrafunctional repeating units in an average ratio of about 0.9 to 1 and having a number-average molecular weight of about 2,480. The PS513 used in the examples described below was obtained from United Chemical Technologies, Inc. It is reported by the manufacturer to be end terminated by propylamine groups and SEC indicates a number average molecular weight of about 4600.

EXAMPLE 1 (Ex1)

Fluorel™ FLS2640Q (500 g), magnesium oxide (Maglite Y™)(60 g) and carbon black (Thermax™)(5 g) were thoroughly compounded on a two roll mill for 40 minutes at 63° F. (water cooled) to obtain a uniform sheet. The sheet was removed and a portion of the compound (30 g) combined with 20 parts SFR100 (5.31 g), 1 part PS513 (0.222 g), and 117.7 g MEK to form a 22 wt % solids dispersion. The solution was mixed 20 hours on a roll mixer. Cure 50 (DuPont) (0.496 g) was dissolved in MEK (10 g) and added at 2.2 parts per 100 parts of Fluorel™ to the solution 30 minutes prior to coating. The solution was ring coated onto Kapton film wrapped around a cylinder to obtain samples for optical micrographs. Domain sizes were measured manually using enlargements of the optical micrographs.

A testing sample was made according to the following procedure. For roughness measurements a solution was prepared as described above and ringcoated once onto a roller comprising: an aluminum core primed with a thin layer of silicone primer and dried in ambient air before application of the base cushion; a base cushion of silicone molded to 183 mils thick; and a layer of thermally conductive silicone (aluminum oxide filled) surface ground to 17 mils thick. Prior to ringcoating, the base cushion was corona treated for 1 minute at 250 watts, at 25 revolutions per minute and the above described dispersion was degassed for 2 minutes under 25 mm Hg vacuum. Samples were cured at 260° C. by air drying for 1 hour followed by 24 hours ramp to 260° C. and then 24 hours at 260° C. A Federal Surfanalyzer 2000 with a chisel tip were used to profile the coated surface. The coating quality is described by the average roughness (RA) and the peak count (PC). Lower values of RA indicate a smoother more uniform coating while lower PC values indicate fewer surface defects.

EXAMPLE 2 (Ex2)

A solution was prepared substantially the same as in Example 1 except that 70 pph SFR100 (18.6 g) and 30 pph PS513 (7.96 grams) was used in a total of 171.4 g MEK.

EXAMPLE 3 (Ex3)

Viton® A fluoropolymer (1000 g), zinc oxide (Aldrich) (100 g), and carbon black (Thermax) (10 g) were thoroughly compounded as in Example 1.

A portion of the compound (30 g) was combined with 50 parts SFR100 (13.5 g) and 128 g MEK to form a 25 wt % solution which mixed for 20 hours on a roll mixer. Cure 50 (DuPont) was dissolved in MEK (10 g) and added to the solution at 3.5 parts per 100 parts of Viton® A (0.652 grams) 30 minutes prior to coating. PS513 was added at 10 parts (1.824 g) 15 minutes prior to coating. The solution was ring coated once and cured at 260° C. as in Example 1

EXAMPLE 4 (Ex4)

A solution was prepared substantially the same as in Example 3 except that 15 parts PS513 (2.736 g) was used instead of 10 parts.

EXAMPLE 5 (Ex5)

Viton® GF fluoroelastomer (500 g), magnesium oxide (Maglite Y™) (60 g), and carbon black (Thermax) (5 g) were compounded as in Example 1. A portion of the compound (30 g) was combined with 19 parts SFR100 (5.2 g), 1 part SP513 (0.265 g), and 139 g MEK and then mixed 14 hours on a roll mixer. Cure 50 (DuPont) was dissolved in MEK and added to the solution at 2.6 parts per 100 parts of Viton® GF (0.918 g) 30 minutes prior to coating. To prepare testing samples for toner release testing the solution was ring coated twice and cured at 260° C. as in Example 1. Roughness measurements were done on the coating on Kapton.

EXAMPLE 6 (Ex6)

The compound in Example 5 (17.9 g) was combined with 47 parts SFR100 (7.45 g), 3 parts PS513 (0.48 g), and MEK (74 g). After mixing 14 hours on a roll mixer, Cure 50 (DuPont) was dissolved in MEK (5 g) and added to the solution at 2.6 parts per 100 parts of Viton® GF (0.4 g) and the solution roll mixed for 20 hours prior to coating. The solution was ring coated and cured as in Example 5.

EXAMPLE 7 (Ex7)

A solution was prepared and coated substantially the same as in Example 6 except that 40 parts SFR100 (6.34 g) and 10 parts PS513 (1.58 g) were combined to form the solution. Cure 50 was added to the solution at 3 pph (0.48 g).

EXAMPLE 8 (Ex8)

A solution was prepared as in Example 7 except that 77 parts SFR100 (10.3 g) and 3 parts PS513 (0.4 g) were combined to form the solution. The Cure 50 was added at 3.5 pph.

EXAMPLE 9 (Ex9)

A solution was prepared substantially the same as in Example 8 except that 70 parts SFR100 (9.35 g) and 10 parts PS513 (1.35 g) were used.

COMPARATIVE EXAMPLE 1 (CE1)

A solution was prepared substantially the same as in Example 1 except that no PS513 was used.

COMPARATIVE EXAMPLE 2 (CE2)

A solution was prepared substantially the same as in Example 3 except that only 1 part PS513 per hundred parts Viton® A was used.

COMPARATIVE EXAMPLE 3 (CE3)

A solution was prepared substantially the same as in Example 3 except that only 3 parts PS513 was used.

COMPARATIVE EXAMPLE 4 (CE4)

A solution was prepared substantially the same as in Example 5 except that no PS513 was used.

COMPARATIVE EXAMPLE 5 (CE5)

A solution was prepared substantially the same as in Example 6 except that 50 parts SFR100 and only 1 part PS513 was used.

COMPARATIVE EXAMPLE 6 (CE6)

A solution was prepared substantially the same as in Example 8 except that 80 parts SFR100 and only 1 part PS513 was used.

TABLE 1

|      | Ra min | Ra max | Ra average | Peak Count | Domain Size ($\mu$m) Average | Std. dev.* |
|------|--------|--------|------------|------------|---------|-----------|
| Ex 1 | 4      | 18     | 10         | 1          | 14      | 6.5       |
| Ex 2 | 11     | 29     | 17         | 15         | 19.6    | 6.5       |
| CE 1 | 10     | 35     | 20         | 16         | 20.8    | 9         |

*Standard deviation

TABLE 2

|      | Ra min | Ra max | Ra average | Peak Count | Domain Size ($\mu$m) Average | Std. dev.* |
|------|--------|--------|------------|------------|---------|-----------|
| Ex 3 | 7      | 30     | 7          | 9          | 28.6    | 19        |
| Ex 4 | 8      | 79     | 8          | 12         | 20      | 15.2      |
| CE 2 | 7      | 36     | 17         | 12         | 127     | 33        |
| CE 3 | 6      | 26     | 14         | 6          | 49      | 35        |

*Standard deviation

TABLE 3

|      | Ra min | Ra max | Ra average | Peak Count | Domain Size ($\mu$m) Average | Std. dev.* |
|------|--------|--------|------------|------------|---------|-----------|
| Ex 5 | 5      | 140    | 30.7       | 30         | 12.2    | 7.1       |
| CE 4 | 11     | 101    | 51         | 49         | 24.7    | 8.9       |
| CE 5 | 11     | 55     | 27         | 33         | 19      | 11.6      |
| Ex 6 | 10     | 44     | 22         | 15         | 13.1    | 6.25      |
| Ex 7 | 5      | 36     | 16         | 10         | 8.6     | 4.2       |
| CE 6 | 21     | 49     | 32         | 59         | 34.2    | 12.8      |
| Ex 8 | 14.5   | 38     | 25         | 37.5       | 20.5    | 11.6      |
| Ex 9 | 6      | 40     | 21         | 15         | 14.3    | 5.3       |

*Standard deviation

The results show that the addition of a functionalized polydimethsiloxane in the manner described herein improves the coating quality and reduces the domain size thus allowing more uniform coverage of the silicone phase.

Toner Release Test

Test samples are employed to evaluate the toner offset and release force characteristics of the fuser member coating. Samples are cut approximately 1-inch square and to the surface of the sample is applied an unmeasured amount of Dow Corning DC200 polydimethylsiloxane fluid.

Each sample is incubated overnight at a temperature of 175° C. Following this treatment, the surface of each sample is wiped with dichloromethane. Each sample is then soaked in dichloromethane for one hour and allowed to dry before off-line testing for toner offset and release properties.

Each sample is tested in the following manner:

A one-inch square of paper covered with unfused styrene-butylacrylate toner is placed in contact with a sample on a bed heated to 175° C., and a pressure roller set for 80 psi is locked in place over the laminate to form a nip. After 20 minutes the roller is released from the laminate.

The extent of offset for each sample is determined by visual examination of the sample surface following delamination. The following numerical evaluation, corresponding to the amount of toner offset remaining on the surface, is employed.

| 1 | 0% offset |
|---|---|
| 2 | 1–20% offset |
| 3 | 21–50% offset |
| 4 | 51–90% offset |
| 5 | 91–100% offset |

Qualitative assessment of the force required for delamination of the paper from the sample is as follows:

| 1 | low release force |
|---|---|
| 2 | moderate release force |
| 3 | high release force |

The numerical values for offset amount and release force are averaged to obtain a single numerical value for which lower values indicate better release properties. The results for release testing on a series of increasing silicone content Fluorocarbon-silicone IPN coatings prepared as described herein are shown in Table 4.

TABLE 4

| Compound | Offset/ Release | Total Silicone Average (pph) | Average Offset/ Release |
|---|---|---|---|
| Ex 5 | 2.5 | 21 | 2.5 |
| CE 5 | 1.9 | 51 | 1.64 |
| Ex 6 | 1.63 | 50 | |
| Ex 7 | 1.38 | 50 | |
| CE 6 | 1.38 | 81 | 1.39 |
| Ex 8 | 1.5 | 80 | |
| Ex 10 | 1.3 | 80 | |

Coatings described herein demonstrate the advantage of increased silicone content on improved release quality as indicated in the test results above. The fuser rollers have excellent toner release properties, without sacrificing coating quality or uniformity. The coating materials exhibit these desirable properties when they are prepared according to the process of this invention.

The invention has been described in detail with particular reference to certain preferred embodiments thereof, but it will be understood that variations and modifications can be effected within the spirit and scope of the invention.

What is claimed is:

1. A fuser member whose outermost layer comprises a fluorocarbon-silicone interpenetrating network composition, comprising:

a fluorocarbon elastomer;
   about 10–150 parts of a curable siloxane polymer;
   about 1–60 parts of a functionalized polydimethylsiloxane of the formula:

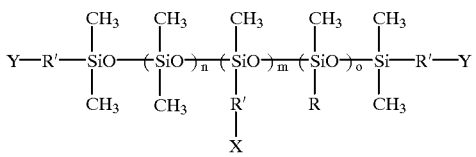

wherein
   R and R' are independently alkyl; haloalkyl; aryl; alkylene; or arylene; all having 1 to 10 carbon atoms;
   X and Y are functional groups having an active hydrogen selected from —$NH_2$, or —NR"H where R" is $C_{(1-6)}$ alkyl or aryl; and where
   n, m and o are positive integers including zero such that n+m+o provides a number average molecular weight in the range of about 1000 to 20,000;
   about 1–10 parts of a fluorocarbon curing agent;
   about 1–10 parts of a fluorocarbon-curing accelerator;
   about 4–30 parts of an acid acceptor filler; and
   about 0–30 weight percent of an inert filler;
   all based on 100 parts fluorocarbon elastomer, wherein the total siloxane polymer content of the fluorocarbon-silicone interpenetrating network composition is about 30.1 weight percent–about 36.7 weight percent.

2. The fuser member according to claim 1 wherein the curable siloxane polymer is
   a) at least one curable silanol-terminated, polyfunctional poly($C_{1-6}$ alkyl)siloxane polymer comprising at least two different functional siloxane units selected from the group consisting of monofunctional, difunctional, trifunctional and tetrafunctional siloxane units;
   b) at least one curable, silanol-terminated, polyfunctional poly($C_{1-6}$ alkyl)arylsiloxane polymers, said siloxane polymer comprising at least two different functional siloxane units selected from the group consisting of monofunctional, difunctional, trifunctional and tetrafunctional siloxane units; or
   c) combinations of a) and b).

3. The fuser member according to claim 2 wherein said polyfunctional poly($C_{1-6}$ alkyl)arylsiloxane polymer is a hard silicone copolymer comprising repeating units of:

$R^3_2SiO$ and $R^4SiO_{1.5}$;
   wherein $R^3$ and $R^4$ are independently $C_{1-6}$ alkyl or aryl, provided that the molar ratio of aryl:$C_{1-6}$ alkyl groups is greater than 1:1.

4. The fuser member according to claim 1, wherein the curable siloxane polymer is a heat-curable polymer.

5. The fuser member according to claim 1, wherein the curable siloxane polymer comprises a silicone polymer comprising repeating units of the formula, $R^1_aSiO_{(4-a)/2}$; wherein $R^1$ is $C_{(1-6)}$ alkyl and a is 0–3.

6. The fuser member according to claim 5 wherein $R^1$ is methyl.

7. The fuser member according to claim 6, wherein the silicone polymer comprises a polydimethylsiloxane having a number average molecular weight between 20,000 and 300,000 and a polymethylsiloxane comprising monofunctional and tetrafunctional siloxane repeating units and having a number average molecular weight between 1,000 and 10,000.

8. The fuser member according to claim 7 wherein the silicone polymer comprises a silanol- or trimethylsilyl-terminated polymethylsiloxane and is a liquid blend comprising about 60 to 80 weight percent of a difunctional polydimethylsiloxane having a number average molecular weight of about 150,000, and 20 to 40 weight percent of a polytrimethylsilyl silicate resin having monofunctional and tetrafunctional repeating units in an average ratio of between 0.8 and 1 to 1, and having a number average molecular weight of about 2,200.

9. The fuser member according to claim 1 wherein the curable siloxane polymer ranges from about 20–80 parts and the functionalized polydimethylsiloxane ranges from about 4–60 parts.

10. The fuser member according to claim 1 wherein the curable siloxane polymer ranges from about 20–80 parts and the functionalized polydimethylsiloxane ranges from about 4–48 parts.

11. The fuser member according to claim 1 wherein the curable siloxane polymer ranges from about 40–77 parts and the functionalized polydimethylsiloxane ranges from about 4–48 parts.

12. The fuser member according to claim 1 wherein the fluorocarbon polymer is an elastomer or a copolymer.

13. The fuser member according to claim 1 wherein the total siloxane polymer content of the fluorocarbon-silicone interpenetrating network composition ranges from 30.1 weight percent–36.1 weight percent.

14. A fuser member whose outermost layer comprises a fluorocarbon-silicone interpenetrating network composition, comprising the following:

a fluorocarbon elastomer;

about 10–150 parts of a curable siloxane polymer;

about 1–60 parts of a functionalized polydimethylsiloxane of the formula:

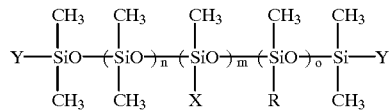

wherein

R is independently alkyl; haloalkyl; aryl; alkylene; or arylene; all having 1 to 10 carbon atoms;

X and Y are functional groups having an active hydrogen selected from $-NH_2$, or $-NR''H$, where R'' is $C_{(1-6)}$ alkyl or aryl; and n, m and o are positive integers including zero such that n+m+o provides a number average molecular weight in the range of about 1000 to 20,000;

about 1–10 parts of a fluorocarbon curing agent;

about 1–10 parts of a fluorocarbon-curing accelerator;

about 4–30 parts of an acid acceptor filler; and about 0–30 weight percent of an inert filler;

all based on 100 parts fluorocarbon elastomer, wherein the total siloxane polymer content of the fluorocarbon-silicone interpenetrating network composition is about 30.1 weight percent–about 36.7 weight percent.

15. The fuser member of claim 14 wherein the fluorocarbon polymer is selected from a copolymer of vinylidene fluoride with hexafluoropropylene; a terpolymer of vinylidene fluoride with hexafluoropropylene and tetrafluoroethylene; and combinations thereof.

16. The fuser member according to claim 14 wherein the curable siloxane polymer is a) at least one curable silanol-terminated, polyfunctional poly($C_{1-6}$ alkyl)siloxane polymer comprising at least two different functional siloxane units selected from monofunctional, difunctional, trifunctional or tetrafunctional siloxane units; or b) the combination of a) and at least one curable, silanol-terminated, polyfunctional poly($C_{1-6}$ alkyl)arylsiloxane polymer, said siloxane polymer comprising at least two different functional siloxane units selected from the group of monofunctional, difunctional, trifunctional or tetrafunctional siloxane units.

17. The fuser member according to claim 14 wherein the curable siloxane polymer ranges from about 20–80 parts and the functionalized polydimethylsiloxane ranges from about 4–60 parts.

18. The fuser member according to claim 14 wherein the curable siloxane polymer ranges from about 20–80 parts and the functionalized polydimethylsiloxane ranges from about 4–48 parts.

19. The fuser member according to claim 14 wherein the curable siloxane polymer ranges from about 40–77 parts and the functionalized polydimethylsiloxane ranges from about 4–48 parts.

20. The fuser member according to claim 14 wherein the curable siloxane polymer ranges from about 40–77 parts and the functionalized polydimethylsiloxane ranges from about 3–10 parts.

21. The fuser member according to claim 14 wherein the total siloxane polymer content of the fluorocarbon-silicone interpenetrating network composition ranges from 30.1 weight percent–36.1 weight percent.

22. A fuser member of claim 1 or 14 wherein the functionalized polydimethylsiloxane are covalently bonded to the fluoroelastomer by at least one amine group.

23. A fuser member of claim 1 or 14 wherein the functionalized polydimethylsiloxane is an $\alpha,\omega$-bis(aminopropyl)-polydimethylsiloxane.

24. A fuser member of claim 23 wherein the functionalized polydimethylsiloxane has a molecular weight between 2,000 and 15,000.

25. The fuser member according to claim 23 wherein the curable siloxane polymer ranges from about 40–77 parts and the functionalized polydimethylsiloxane ranges from about 3–10 parts.

26. The fuser member according to claim 25 wherein the total siloxane polymer content of the fluorocarbon-silicone interpenetrating network composition ranges from 30.1 weight percent–36.1 weight percent.

27. A fuser member whose outermost layer comprises a fluorocarbon-silicone interpenetrating network composition, comprising:

a fluorocarbon elastomer;

about 50–150 parts of a curable siloxane polymer;

about 5–50 parts of a functionalized polydimethylsiloxane of the formula:

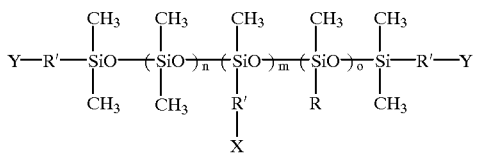

wherein

R and R' are independently alkyl; haloalkyl; aryl; alkylene; or arylene; all having 1 to 10 carbon atoms;

X and Y are functional groups having an active hydrogen selected from —NH$_2$, or —NR"H where R" is C$_{(1-6)}$ alkyl or aryl; and where n, m and o are positive integers including zero such that n+m+o provides a number average molecular weight in the range of about 1000 to 20,000;

about 1–10 parts of a fluorocarbon curing agent;

about 1–10 parts of a fluorocarbon-curing accelerator;

about 4–30 parts of an acid acceptor filler; and about 0–30 weight percent of an inert filler;

all based on 100 parts fluorocarbon elastomer, wherein the total siloxane polymer content of the fluorocarbon-silicone interpenetrating network composition is about 30.1 weight percent–about 36.7 weight percent.

28. The fuser member according to claim 27 wherein the total siloxane polymer content of the fluorocarbon-silicone interpenetrating network composition ranges from 30.1 weight percent–36.1 weight percent.

* * * * *